UNITED STATES PATENT OFFICE.

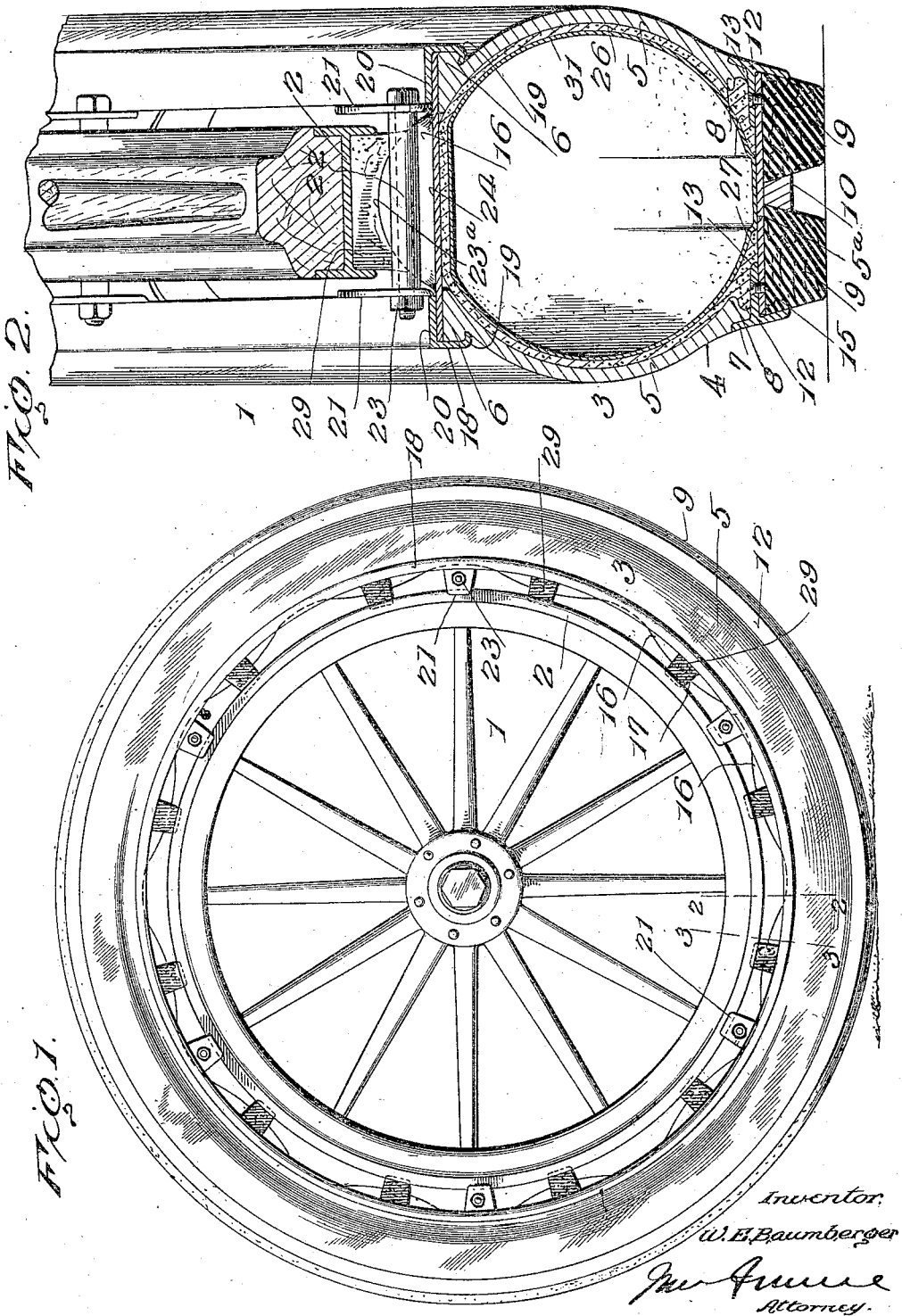

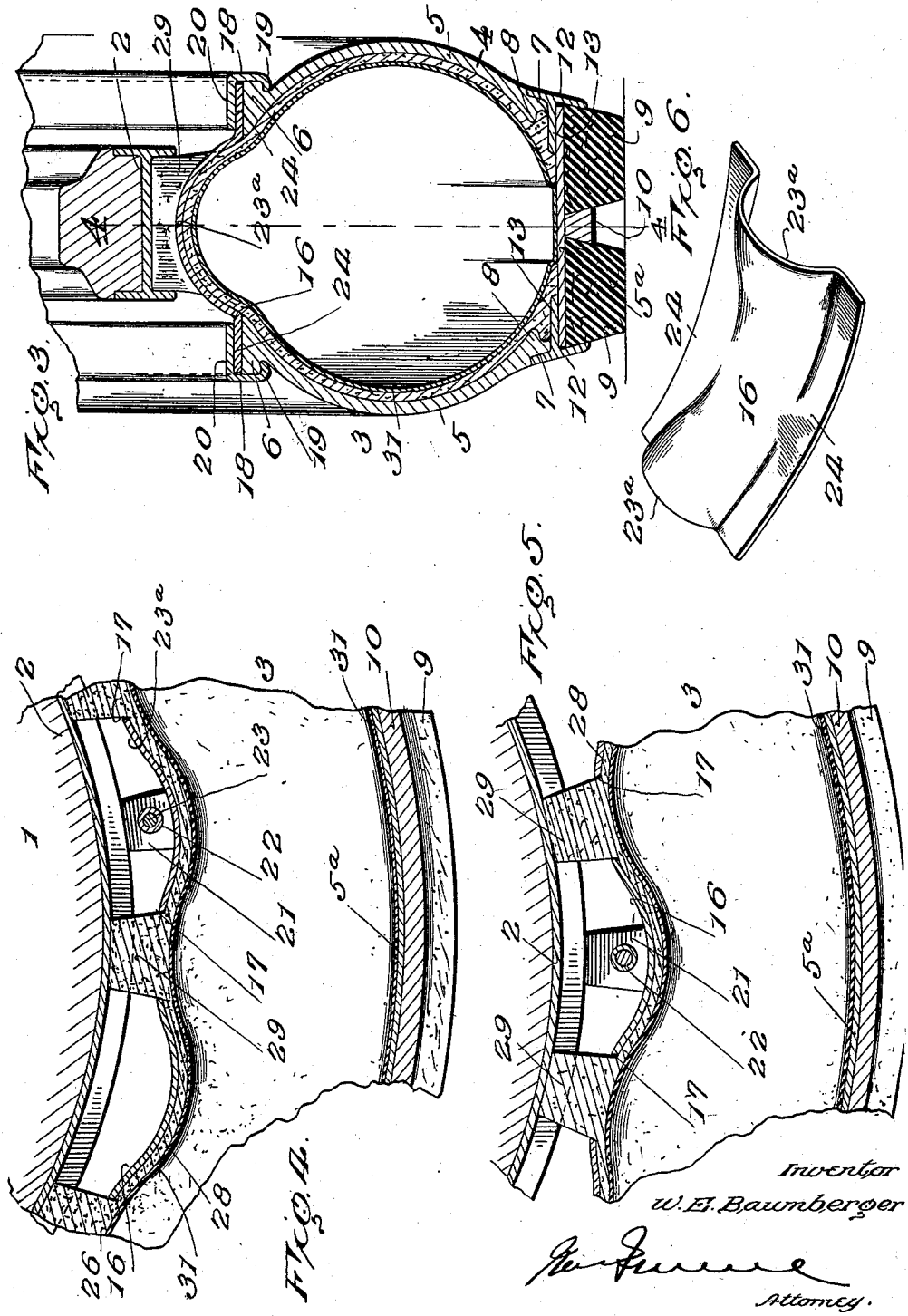

WALTER E. BAUMBERGER, OF SACRAMENTO, CALIFORNIA.

ARMORED PNEUMATIC TIRE.

1,277,831.     Specification of Letters Patent.     Patented Sept. 3, 1918.

Application filed February 28, 1918. Serial No. 219,667.

*To all whom it may concern:*

Be it known that I, WALTER E. BAUMBERGER, a citizen of the United States of America, residing at Sacramento, in the county of Sacramento and State of California, have invented certain new and useful Improvements in Armored Pneumatic Tires, of which the following is a specification.

This invention relates to armored pneumatic tires.

The object of the invention is to provide a tire having all of the advantageous characteristics of a pneumatic tire, and at the same time provide a non-puncturable structure.

A further object of the invention is to provide a tire, wherein the tube is inclosed in a metal casing or armor, the latter moving eccentrically with reference to the wheel, when load strain disturbs the air pressure in the tube.

Another object of the invention is to provide a structure wherein the load is sustained at circumferential intervals on the periphery of the wheel, so that when the sustaining air pressure in the tube is disturbed at any point, the pressure will be distributed throughout the tube.

The invention also aims to provide specific means for supporting the tire on the wheel, and at the same time provide a structure wherein the tire may slip on the felly, when undue load strain is applied.

The invention also comprehends improvements in the details of construction and arrangement of parts which will be hereinafter described and particularly pointed out in the claims.

In the accompanying drawings:—

Figure 1 is a side elevation of a wheel equipped with my improved tire structure.

Fig. 2 is a transverse section of same on the line 2—2 of Fig. 1.

Fig. 3 is a similar view on the line 3—3 of Fig. 1.

Fig. 4 is an enlarged detail section on the line 4—4, Fig. 3, illustrating the position of the parts when load strain occurs vertically on a line drawn through one of the projections and the axis of the wheel.

Fig. 5 is a similar view but showing the tire in position when load strain occurs on a line drawn vertically through the axis of the wheel and between two projections.

Fig. 6 is a detail perspective view of one of the caps.

1 indicates a wheel, the felly of which is provided with a channel, and as shown is formed in a rim 2, but any other structure which will perform the function may be employed.

3 indicates the tire structure which is mounted on the wheel, the parts being so arranged that there may be a relative movement between the tire and the wheel, as will be hereinafter explained.

4 indicates an outer metal casing, or armor, comprising annular side plates 5, and an annular tread band $5^a$, each side plate being provided on its inner periphery with a flange 6, and at its outer periphery with an annular groove 7, and flange 8. On the outer periphery of the tread band are two resilient annular tread bands 9, each having beveled sides, and fitting between these bands is a ring 10, having beveled edges to engage the sides of bands 9, to key the latter in place. 12 indicates rings, each having a lateral flange 13 which fit over the flanges 8, and on which the tread band is supported. The rings engage the grooves 7, and the outer portions are bent inwardly to form beveled surfaces, which engage the outer beveled surfaces of the annular resilient bands 9, the lateral flanges being fastened to the tread band by securing devices, such for instance as screws 15.

Extending across the inner peripheral portion of the annular side plates, are caps 16, spaced apart to form openings 17. These caps are retained in fixed relation with the annular side plates, by a pair of clamp rings 18, each provided with an inwardly extended hook shape flange 19, which fit snugly over the flanges 6 on the side plates. The clamp rings are also provided with lateral flanges 20, which fit over the sides of the caps, and extending from said lateral flanges are lugs 21. The lugs of the respective rings are disposed in transverse alinement, and interposed between each adjacent pair of lugs is a sleeve 22, and extending therethrough is a bolt 23, held in locked position by a nut. The bolts and sleeves are interposed between the felly of the wheel and the tire structure, while the lugs 21, extend inwardly and beyond the periphery of the felly, and serve as guides to prevent the tire separating from the wheel, should the structure about to be described, become disengaged from the channel.

Each cap is formed longitudinally on an arc, corresponding to the arc of the inner periphery of the tire, and at opposite ends it is bent to form curved depressions 23ª, the metal forming the depressions tapering toward the center of the cap, and merges into a transversely flat intermediate portion 24, as shown in Fig. 5. The caps being secured in position on the inner portion of the side plates, form a part of the metal casing to inclose the pneumatic tire.

Inclosed in the metal casing is a tire casing 26, composed of canvas and rubber, somewhat after the fashion of the usual automobile tire casing. This inner casing is open at its outer periphery, and adjacent thereto it is provided with lateral flanges 27, which engage the flanges 8 on the annular plates and the tread band 5ª. The inner closed periphery of the inner casing is provided with bulges 28, corresponding to the depressions 23ª in the caps and fit snugly therein. Between adjacent bulges the inner casing is provided with inwardly extended projections 29, which pass through the openings 17, formed between adjacent caps. These projections are of resilient material, and project beyond the caps and fit in the channel in the felly, and may be formed with, or they may be attached to, the inner casing.

In the inner casing is a tube 31, which assumes the contour of said casing when inflated, air being introduced through an air valve suitably located near the felly, or such other point as may be found convenient.

By reference to Fig. 1 it will be seen that the projections are in spaced relation and that their inner ends frictionally engage the periphery of the wheel in the channel. Furthermore, it will be noted that because of the shape and construction of the caps the inner portion of the inner casing and the tube assume continuous protuberances and depressions somewhat after the fashion of waves. It follows that by reason of this construction the load strain of the vehicle is supported at intervals on separated air cushions, and that in the event of the disturbing of the air, the pressure is distributed throughout the entire body of the tube.

In operation, assume that load pressure is applied, the wheel will be depressed, and tire and wheel become eccentric to each other, the tire of course moving as a whole but the pressure in the tube is distributed throughout the latter. When pressure of the wheel is applied the projections 29 are depressed; consequently the inner casing, acting on the tube disturbs the compressed air therein, and distributes the pressure. The number, and the extent of movement of the projections is largely due to their relative positions with reference to a vertical line drawn through the axis of the wheel. For instance, as shown in Fig. 4 the load pressure is directly in line with one of the projections 29; consequently the depression of the inner casing and the tube will be greater in line with this projection, than that in a line between adjacent projections. The load strain is absorbed by two elements, that is the resilient projections, plus the pressure in the tube, the result being all minor shocks will be largely absorbed by the projections. However, when other than what may be termed minor shocks occur, then the resilient projections, plus the pneumatic structure combined, come into play.

When the wheel is depressed by load strain, as stated, the entire tire structure has a bodily movement with reference to the wheel. There must then be either a slipping action between the parts, or the motion must be taken up. The frictional grip between the projections and the wheel is determined by the relative length of the projections, plus the amount of pressure in the tube. Consequently when pressure is introduced in the tube, it acts to force the projection into contact with the periphery of the felly, and likewise, this same action acts to compress the material of the projections. Under these conditions a tight frictional grip between tire and wheel is provided. It follows that when the wheel is depressed, the peripheral surface may either slip on the projections remote from the point of pressure, or they may yield circumferentially, but in any event they being under compression, any slight distortion between the wheel and tire will in no way destroy the frictional relation between the parts at any point in the circumference of the wheel, but if abnormal shocks should occur the movement of the tire as a whole will cause the inner ends of the projections at the top of the wheel to become disengaged from the peripheral surface. Of course, when an abnormal load shock occurs there is a greater movement between the tire and wheel, but in no instance in the normal operation of the tire in case of slight load shocks, is there a time when the frictional contact is destroyed.

In case of accident, or for any other reason and primarily as a safeguard, if the projections should become disengaged from the channel, the lugs 21 will act as guides to prevent the tire becoming detached from the wheel.

Fig. 5 shows the condition when load strain occurs between adjacent projections. In this case, two projections are in action to sustain the load, the operation and the movement of the parts being substantially the same as that previously described, except that direct movement of the inner casing and tube adjacent two projections come into play instead of one. In this instance the tube and inner casing are depressed and become disengaged from the depressed walls of the caps, but is intermediately held in contact with the central portion of said caps.

The disposition of the projections, and the length of the caps will be determined by the diameter of the wheel, and the use to which the tire is to be put.

By disposing the caps and projections as described, there is an alternate arrangement of contact points with the wheel, and points which are in contact between the wheel and the tire, the result being that any disturbance of the air pressure in the tube is distributed throughout the entire tire structure, and at the same time the tire as a whole and the wheel have a relative movement.

While I have described the preferable form of my tire, yet many detail changes may be made without departing from the spirit of the invention.

What I claim is:—

1. In combination, a channeled wheel felly, a tire mounted thereon, said tire comprising a metal outer casing, an inner flexible casing inclosed within the metal casing, a continuous tube in the inner casing adapted to contain air under pressure, spaced apart caps on the inner portion of the metal casing, said caps being spaced from the felly of the wheel, and projections extending from the inner casing and in frictional engagement with the periphery of the wheel felly, the caps acting to depress the inner portion of the inner casing and tube between the projections.

2. In combination, a wheel felly, a tire mounted thereon, said tire comprising an inner and an outer casing inclosing a tube adapted to contain air under pressure, resilient projections extending from the inner casing and engaging the periphery of the felly, means mounted on the outer casing to engage the inner casing and cause undulations in same and the tube, the pressure in the tube coöperating with the resiliency of the projections to cause the latter to frictionally engage the felly, whereby when load strain is applied the felly acting on the projections will depress the inner casing and the tube adjacent the projections and the outer casing will move as a whole with reference to the felly.

3. In combination, a channeled wheel felly, a tire mounted thereon comprising an outer metal casing, spaced apart caps extending across the inner portion of the metal casing, each cap having depressions at its ends, an inner flexible casing, projections extending from the casing and engaging the felly, a tube adapted to contain air inclosed in the flexible casing, the pressure of air causing the inner casing and the tube to conform to the configuration of the depressions and the inner ends of the projections to frictionally engage the periphery of the felly.

4. In combination, a channeled wheel felly, a tire mounted thereon, said tire comprising a pair of annular metal sides, a metal tread band, spaced caps at the inner portion of the side plates, means between the felly and the tire for securing the caps to the side plates, each cap having depressions, an inner flexible casing inclosed in the outer casing, and fitting snugly in the inner surfaces of the caps, projections extending from the inner casing between the caps and engaging the channeled felly, and a tube adapted to contain air under pressure inclosed in the inner casing.

5. A tire comprising an inner tube adapted to contain air under pressure, a flexible inner casing in which the tube is inclosed, projections extending from the inner casing, and an outer metal casing embracing the inner flexible casing, the metal casing having openings formed on its inner side through which the projections extend, and said metal casing having an undulating inner surface between the openings, the tube and inner casing fitting snugly said undulating surface.

6. In combination, a wheel felly, a tire mounted thereon comprising an outer casing provided on its inner portion with caps which are spaced from the felly and are formed with projections, an inner flexible casing inclosed in the outer casing, projections extending from the inner flexible casing and beyond the caps and frictionally engaging the felly, and a continuous inner tube inclosed within the inner flexible casing adapted to contain air under pressure, the inner flexible casing and the inner tube fitting the contour provided by the caps and the outer casing.

7. In combination, a wheel felly, a tire mounted thereon, said tire comprising an outer casing provided with undulations on its inner periphery and a plurality of openings, and a yielding continuous tubular member inflated by compressed air and contained in the outer casing, and provided with projections which engage the felly, said tubular member fitting snugly the undulations in the outer casing.

8. A tire comprising an outer armored casing provided with undulations on its inner periphery and spaced openings therebetween, an inner casing inclosed in the outer casing, projections extending inwardly from the inner casing and through the openings and adapted to engage a wheel, and a continuous inner tube inflated by compressed air and contained in the inner casing.

9. In combination, a felly, a tire spaced therefrom, said tire comprising an outer casing provided with annular flanges, caps extending across the flanges said caps having depressions, clips engaging the flanges and the caps, said clips extending inwardly beyond the plane of the periphery of the felly, bolts connecting the clips, an inner casing inclosed in the outer casing projections extending from the inner casing and engaging the felly, and an inflated tube inclosed in the inner casing.

In testimony whereof I affix my signature.

WALTER E. BAUMBERGER.